UNITED STATES PATENT OFFICE.

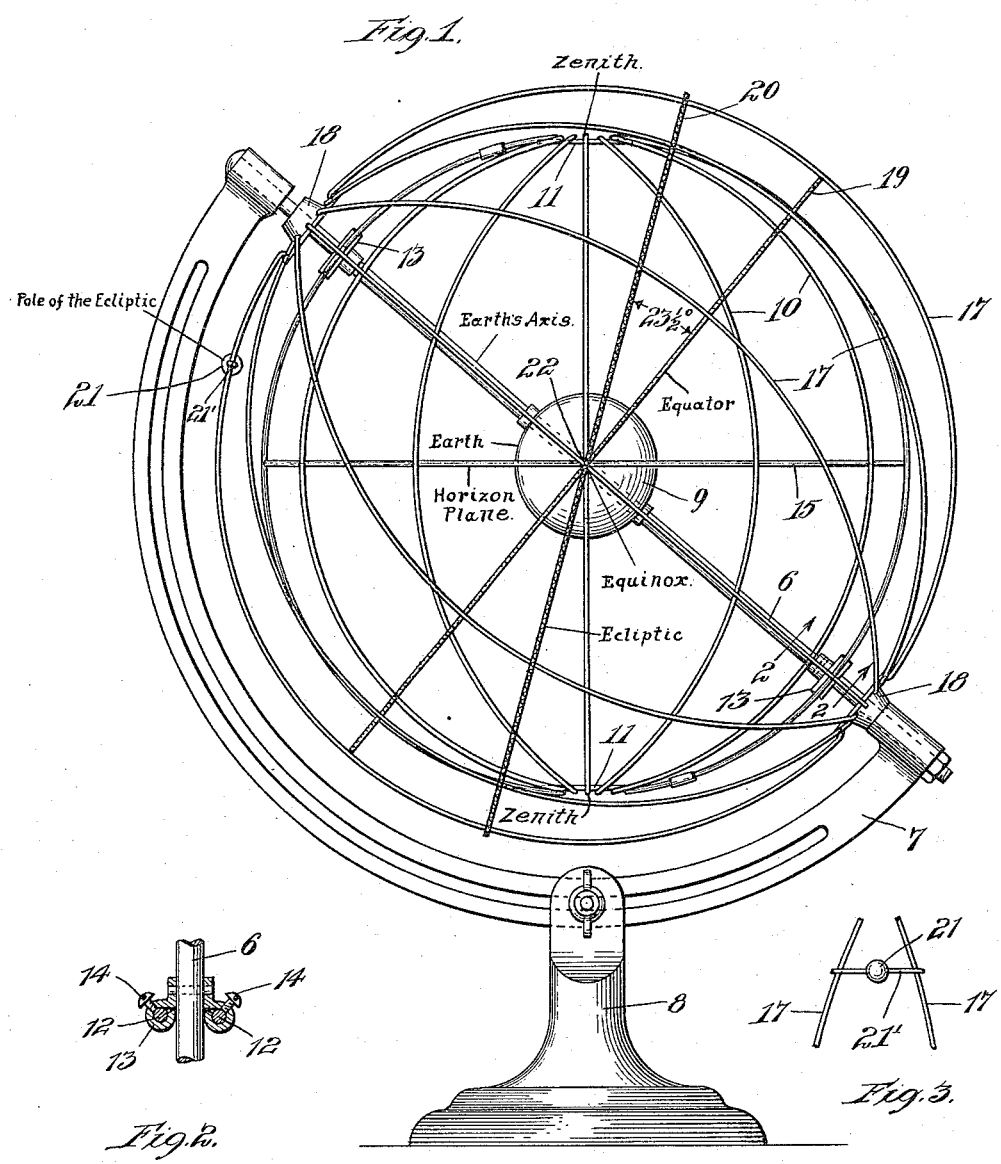

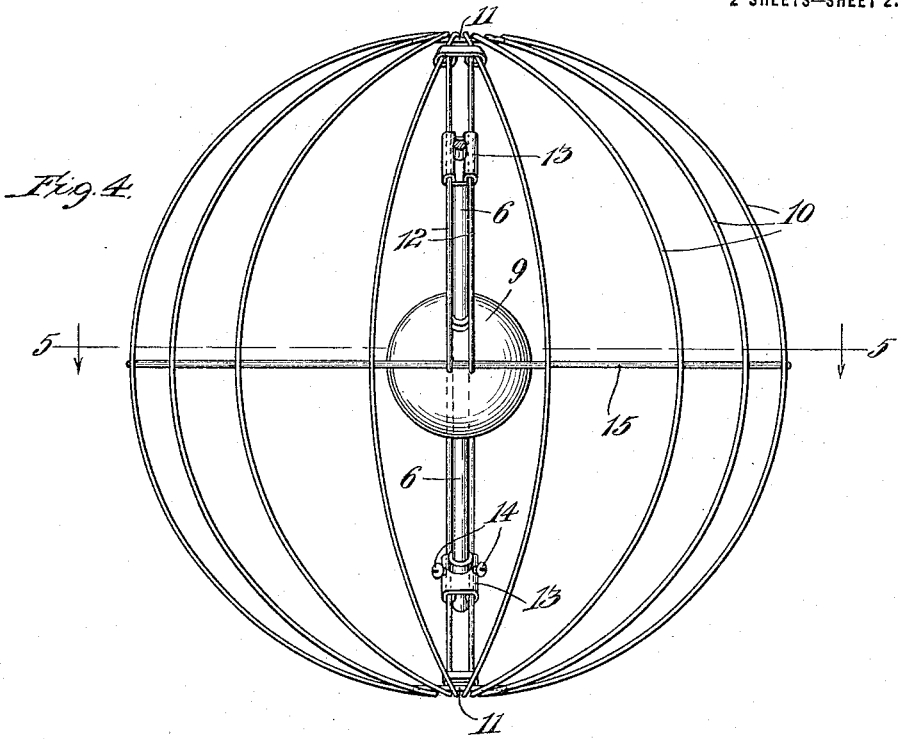
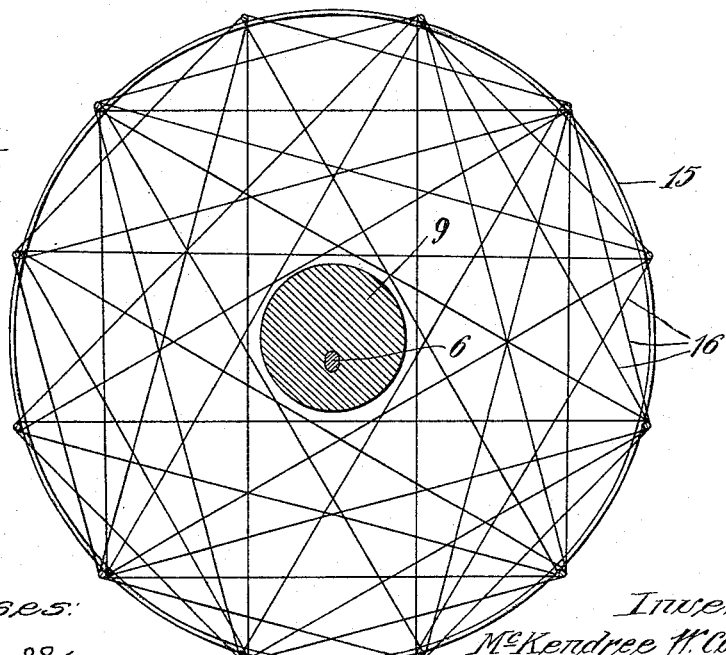

McKENDREE W. COULTRAP, OF NAPERVILLE, ILLINOIS.

ASTRONOMICAL GLOBE.

1,148,891.     Specification of Letters Patent.     Patented Aug. 3, 1915.

Application filed November 19, 1914. Serial No. 872,968.

*To all whom it may concern:*

Be it known that I, McKendree W. Coultrap, a citizen of the United States, and a resident of the city of Naperville, county of Dupage, and State of Illinois, have invented certain new and useful Improvements in Astronomical Globes, of which the following is a specification.

My invention relates to improvements in astronomical globes, and has for its object the provision of a simple and efficient construction of this character adapted to facilitate the study of astronomy.

The invention consists in the combinations and arrangements of parts hereinafter described and claimed.

The invention will be best understood by reference to the accompanying drawings forming a part of this specification, and in which, Figure 1 is a side view of a construction embodying my invention, Fig. 2, a section taken on line 2—2 of Fig. 1, Fig. 3, a detail view illustrating the mounting of a marker indicating the pole of the ecliptic, Fig. 4, a detail view of another globe employed in the construction, and Fig. 5, a horizontal section taken on line 5—5 of Fig. 4.

The preferred form of construction, as illustrated in the drawings comprises a spindle 6 which is mounted in a segmental bracket 7 adjustable in a support or standard 8, as shown. An opaque spherical body 9 is secured centrally to spindle 6 to represent the earth. An inner skeleton globe is arranged about the spherical body 9, the same being of substantially spherical form, and formed of a plurality of bent wires 10, which might be compared to widely separated meridians of longitude, and are connected at their opposite ends to plates 11 representing the zenith points with respect to the earth represented by body 9. The inner globe is transparent due to the fact that it is formed of widely separated wires 10, and is provided with parallel wires 12 supporting adjustable supporting plates 13 secured to spindle 6, each of said plates being provided with set screws 14 for securing the same in adjusted positions on wires 12, as indicated. By this arrangement, it will be observed that the spindle 6 and the inner globe may be adjusted to represent the astronomical situation of practically any point on the earth's surface, the adjustment shown being substantially that for Chicago, with the proper zenith point located directly above the point on the spherical body 9 occupied by the city of Chicago. A wire 15 is arranged on the periphery of said inner globe in a diametric plane perpendicular to a line connecting the zenith points and a plurality of distinctly colored cords or wires 16 are arranged within the ring formed by wire 15 to indicate what might be termed a horizon plane, to a person situated on the spherical body 9 at substantially the point thereon corresponding to the situation of Chicago on the earth's surface and capable of seeing to infinity. Said inner globe, with its zenith and horizon plane thus representing what may be conveniently termed the horizon system. An outer globe, formed of wires 17 similar to the wires 10 and connected at each end with bearing plates 18, rotatably mounted on spindle 6, is arranged about said inner globe and concentrically therewith. This outer globe is provided with a distinctly marked peripheral wire 19 arranged in a diametric plane perpendicular to spindle 6, representing the Equator, and another distinctly marked peripheral wire 20 is arranged thereon on a diametric plane making an angle of twenty-three and one-half degrees with the plane of said Equator wire, said wire 20 representing the ecliptic, or the apparent path of the sun, the sun being always found somewhere upon said path. A marker 21 is arranged on the periphery of said outer globe, being supported thereon upon a cross wire 21' secured to the proper wires 17 in a perpendicular to the plane of wire 20 passing through the center of globe 9, said marker representing the pole of the ecliptic. Intersections 22 of the wires 19 and 20 are also suitably marked or indicated, said intersections indicating the vernal and autumnal equinoxes, as will be readily understood by those skilled in the art. Thus, the outer globe represents what may be termed the ecliptic and equatorial systems, and the outer and inner globes combined represent what may be termed the celestial sphere. By this construction the apparatus may be readily set to correspond with a point at any latitude on the earth's surface and then by rotating the spherical body 9, and the two globes, the different astronomical phenomena may be readily and clearly depicted and explained.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. An astronomical globe comprising an outer globe; an inner globe; means indicating a horizon plane in said inner globe, and a body representing the earth within said globes, substantially as described.

2. An astronomical globe comprising an outer skeleton globe; an inner skeleton globe; means indicating a horizon plane in said inner globe, and a body representing the earth within said globes, substantially as described.

3. An astronomical globe comprising an outer rotatable globe; an inner rotatable globe; means indicating a horizon plane in said inner globe, and a body representing the earth within said globes, substantially as described.

4. An astronomical globe comprising an outer rotatable skeleton globe; an inner rotatable skeleton globe; means indicating a horizon plane in said inner globe, and a body representing the earth within said globes, substantially as described.

5. An astronomical globe comprising an outer wire globe; an inner wire globe; means indicating a horizon plane in said inner globe, and a body representing the earth within said globes, substantially as described.

6. An astronomical globe comprising an outer rotatable wire globe; an inner rotatable wire globe; means indicating a horizon plane in said inner globe, and a body representing the earth within said globes, substantially as described.

7. An astronomical globe comprising an outer rotatable wire globe provided with a wire representing the Equator and a wire representing the ecliptic; an inner rotatable wire globe provided with a diametric wire plane representing a horizon plane; and a rotatable body representing the earth within said globes, substantially as described.

8. An astronomical globe comprising an adjustable segmental bracket; a spindle mounted in said bracket; a spherical body secured centrally to said spindle; a wire globe secured to said spindle concentrically with said spherical body; means for adjusting said globe angularly with reference to said spindle; a diametric plane in said globe representing a horizon plane; an outer wire globe rotatably mounted on said spindle concentric with said spherical body; a distinctly marked wire arranged on the periphery of said outer globe in a diametric plane perpendicular to said spindle and representing the Equator; a distinctly marked wire on the periphery of said outer globe arranged in a diametric plane making an angle of twenty-three and one-half degrees with the plane of said Equator wire representing the ecliptic; and a marker on the periphery of said outer globe positioned on the perpendicular to the plane of said ecliptic passing through the center of said outer globe, substantially as described.

9. An astronomical globe comprising a spindle; a spherical body secured centrally to said spindle; a wire globe secured concentrically with said body; means for adjusting said globe angularly with reference to said spindle; a diametric plane in said globe representing a horizon plane; and an outer wire globe rotatably mounted on said spindle concentrically with said spherical body, substantially as described.

In testimony whereof I have signed my name to this specification in the presence of two subscribing witnesses.

McKENDREE W. COULTRAP.

Witnesses:
ARTHUR A. OLSON,
JOSHUA R. H. POTTS.

Copies of this patent may be obtained for five cents each, by addressing the "Commissioner of Patents, Washington, D. C."